United States Patent Office 2,818,365
Patented Dec. 31, 1957

2,818,365

METHOD OF DESTROYING NEMATODES EMPLOYING THIOALKYLAMINES

George F. Deebel, Dayton, Ohio, and Philip H. Santmyer, Florissant, Mo., assignors to Monsanto Chemical Company, St. Louis, Mo., a corporation of Delaware No Drawing. Application December 22, 1954
Serial No. 477,112

5 Claims. (Cl. 167—22)

This invention relates to the control of endoparasitic and ectoparasitic worms which exist in the soil at some stage of their life cycles, for example, eggs, larvae and adult worms. The invention is particularly directed to methods of inhibiting and eradicating nematodes or eelworms, e. g., such as the root-node nematode, which attack subterranean plant development.

The control of nematodes and other parasitic worms in soil is a complex problem. These organisms, either in the egg, larvae or adult stage, are protected by a difficultly permeable membrane. Hence the effective toxicant must have both the property of penetrating the resistant coatings and the ability to kill. It must also be readily dispersible in soils or other environment of the organism and be stable when incorporated therein. Since the object of ridding soils of nematodes and parasites is to provide a beneficial growth media for plants, the nematocide or parasiticide must not be phytotoxic to plants, or, if phytotoxic, this effect must not be long-lived. Such a nematocide, either itself or some phytotoxic decomposition product thereof, should be such that, previous to planting, it is removed from the soil by evaporation, by rain washing or by soil bacterial decomposition.

For the reasons set forth above, completely effective agents for nematodes and other parasitic worm life are not generally available. Furthermore one skilled in the art cannot predict the effectiveness of compounds as practicable toxicants, even though the physical and biological properties of the compounds are well known.

Since a very careful balance of physical and chemical properties is required in order to provide a chemical substance useful in controlling nematodes and other parasitic worms, this invention has for its principal purpose the provision of compounds which have the above described requisite properties. A further purpose of this invention is to provide a useful method of freeing soils from objectionable nematode life. Other purposes of this invention will be evident from the following specification.

It has now been found that certain thio-amines are very effective as nematocides and as agents for controlling other parasitic worms. The presently useful compounds are S-substituted thioalkylamines of the following structural formula:

$$R-S-Y-NH_2$$

in which R is a hydrocarbon radical free of non-benzenoid unsaturation and containing from 1 to 18 carbon atoms and Y is an alkylene radical of from 1 to 5 carbon atoms.

Thio-amines of the above formula are readily available compounds which are obtainable in known manner; for example, by the reaction of a terminally halogenated alkyl amine with a mercaptide (see Brighton, J. Amer. Chem. Soc., 458–9 (1943)), by the amination of a chloroalkyl alkyl sulfide (see Jirousek et al., Chem. Listy 43, 183–4 (1949), Chem. Abs. 45, 542 (1951)), or by the reaction of an alkyleneimine with a thiol (see Berchet U. S. Patent No. 2,304,623).

A class of thio-amines having the above formula which is particularly useful for the present purposes comprises S-substituted 2-thioethylamines of the formula $$RSCH_2CH_2NH_2$$

wherein R is as above defined. This includes 2-(alkylthio)ethylamines having from 1 to 18 carbon atoms in the alkyl radical, for example, 2-(methylthio)ethylamine, 2-(isopropylthio)ethylamine, 2-(tert-butylthio)-ethylamine, 2-(isoamylthio)ethylamine, 2-(n-hexylthio)-ethylamine, 2-(n-heptyl)ethylamine, 2-(2-ethylhexyl)-ethylamine, 2-(nonylthio)ethylamine, 2-(5-ethyl-2-nonylthio)ethylamine, 2-(tert-dodecylthio)ethylamine, 2-(2-n-propylheptylthio)ethylamine, 2-(2,6,8-trimethylnonylthio)ethylamine, 2-(7-ethyl-2-methyl-4-undecylthio)-ethylamine, 2-(n-tetradecylthio)ethylamine, 2-(n-hexadecylthio)ethylamine, 2-(n-octadecylthio)ethylamine, etc. Other compounds of the formula $RSCH_2CH_2NH_2$ which are useful for the present purpose include the 2-(arylthio)ethylamines, e. g., 2-(phenylthio)ethylamine and 2-(1- or 2-naphthylthio)ethylamine and the ar-alkylderivatives thereof, e. g., 2-(2-, 3- or 4-tolylthio)-ethylamine, 2-(4-ethylphenylthio)ethylamine, 2-(2,3-dimethylphenylthio)ethylamine, 2-(4-tert-dodecylphenylthio)ethylamine, 2-(1-tert-butyl-1-naphthylthio)ethylamine, etc. The 2-(alkarylthio)ethylamines, e. g., 2-(berzylthio)ethylamine, 2-(2-phenylethylthio)ethylamine, 2-(4-tert-dodecylbenzylthio)ethylamine, or 2-(2-methyl-1-naphthylthio)ethylamine are likewise useful. Still another class of presently useful S-substituted β-thioethylamines comprises those in which the S-substituent is a cycloaliphatic radical or contains such a radical, e. g., 2-(cyclopentylthio)ethylamine, 2-(2-methylcyclopentylthio)ethylamine, 2-(cyclohexylthio)ethylamine, 2-(cyclohexylmethylthio)ethylamine and 2-(4-cyclohexylphenylthio)ethylamine.

Other S-substituted thioalkylamines which are presently useful are, e. g., 3-(ethylthio)propylamine, 2-(n-octylthio)-1-methylethylamine, 4-(n-dodecylthio)-n-butylamine, 3-(tert-butylthio)-2,2-dimethylpropylamine, 4-(2-ethylhexylthio)-3-methylbutylamine, 5-(methylthio)-pentylamine, 3-(phenylthio)propylamine, etc.

The invention is further illustrated, but not limited, by the following examples:

EXAMPLE 1

In evaluating the thio-amines as nematocidal agents, testing was conducted on an aqueous nematode culture. The compounds being examined were introduced into the culture at varying concentrations representing 30 to 600 lbs. per acre, the calculations being based on a six inch depth in a soil containing 30 percent of moisture. It is known that a nematode, when placed in water, flexes its body at a more or less constant rate and that the effect of a nematocide can be estimated reasonably accurately by counting the rate of this flexing action. This motility was observed through a microscope and the number of flexures was counted, the effect of the nematocide being expressed as a percentage of the normal flexing rate of a control dispersion not containing a nematocidal agent.

The following table sets forth the motility of the nematode at various intervals of time ranging from 10 minutes to 24 hours with the nematocide being present at a concentration of 0.1 percent:

Table I

| Amine, at 0.1% Concn. | Percent Mobility after— | | | |
|---|---|---|---|---|
| | 10 min. | 1 hr. | 2 hrs. | 24 hrs. |
| 2-(Methylthio)ethylamine | 75 | 20 | 20 | 0 |
| 2-(Octylthio)ethylamine | 0 | 0 | 0 | 0 |
| 2-(Dodecylthio)ethylamine | 0 | 0 | 0 | 0 |
| 2-(Phenylthio)ethylamine | 0 | 0 | 0 | 0 |

When tested in the 0.01% concentration, 2-(octylthio)-ethylamine and 2 - (dodecylthio)amine each gave 0.0% motility at 10 minutes, one hour, 2 hours and 24 hours.

EXAMPLE 2

Testing of the 2-(dodecylthio)ethylamine in soil was conducted as follows: Five hundred grams of uninfected or heat-sterilized soil was placed in a container. The soil was then inoculated with the root-node nematode, *Meloidogyne Spp*, by addition of 25 ml. of a suspension prepared by grinding the 2 g. of the washed roots of plants infected by the nematode in 100 ml. of water. After inoculating the soil, sufficient water was added to bring the potting soil to approximately 50 percent of field capacity. Twenty-five mls. of a 2.0% aqueous solution of the 2-(dodecylthio)ethylamine was then added to the container of soil as a drench. This treatment gave an 0.1% concentration of the chemical in the soil. The containers were capped, and allowed to stand for one week, at the end of which time a two-week old Marglobe tomato seedling was transplanted to the container. An untreated, but similarly inoculated, control was also planted. After a growing period of two months, the tomato plants were harvested and the roots washed and examined for evidence of infection. Roots of plants which had been grown in the treated and inoculated soil showed no infection and no evidence of phytotoxic effect, whereas those of the control, i. e., plants grown in the inoculated but untreated soil, were heavily infested.

These nematocidal compositions are effective in eliminating or controlling nematode activity when applied to the soil at the rate of 50 to 600 lbs. per acre. Preferred level of application useful in soils of average infestation will be from 50 to 200 lbs. per acre.

Obviously, heavily infested areas may require the use of higher proportions and lightly infested areas may be treated effectively with smaller proportions. The compositions being water-dispersible may be applied by spraying on a cultivated field so as to permit penetration to a substantial depth. More effective methods of distribution of the nematocide may involve the introduction in irrigation water or by injection into the soil by a suitable jet following a plow or harrowing device. Other methods of treating soils with liquid compositions are adapted for use in the practice of this invention.

In addition to the use in soils, the invention may be practiced in any other nematode environment, for example, green-house potting mixtures and other soil substituted. Nematode environments may include rooted plants, tubers, seeds and bulbs, in which case the toxicant is used as a rinse to remove and destroy eggs, larvae and adult nematodes which may be present.

The present thio-amines are useful in destroying endoparasitic worms other than nematodes which frequently infect barnyards or other areas frequented by domestic animals and fowl. The treatment of the surface soils in such localities will minimize infections by flukes, tapeworms and other helminth parasites in the animals and fowl by destruction of eggs and larvae of the parasites during the soil phase of their life cycles.

What we claim is:

1. The method of treating nematode-infested soil which comprises dispersing in said soil a quantity sufficient to kill nematodes of a compound having the structural formula $$R—S—Y—NH_2$$

in which R is a hydrocarbon radical and selected from the class consisting of alkyl and aryl radicals and containing from 1 to 18 carbon atoms and Y is an alkylene radical of from 1 to 5 carbon atoms.

2. The method of treating nematode-infested soil which comprises dispersing in said soil a quantity sufficient to kill nematodes of a compound having the structural formula $$RSCH_2CH_2NH_2$$

wherein R is a hydrocarbon radical and selected from the class consisting of alkyl and aryl radicals and containing from 1 to 18 carbon atoms.

3. The method of treating nematode-infested soil which comprises dispersing in said soil a quantity sufficient to kill nematodes of 2-(octylthio)-ethylamine.

4. The method of treating nematode-infested soil which comprises dispersing in said soil a quantity sufficient to kill nematodes of 2-(dodecylthio)-ethylamine.

5. The method of treating nematode-infested soil which comprises dispersing in said soil a quantity sufficient to kill nematodes of 2-(phenylthio)-ethylamine.

References Cited in the file of this patent

UNITED STATES PATENTS

| 2,112,381 | Salzberg | Mar. 29, 1938 |
| 2,282,710 | Dietrich | May 12, 1942 |
| 2,304,623 | Berchet | Dec. 8, 1942 |
| 2,402,642 | Lazier | June 25, 1946 |

OTHER REFERENCES

Frear, D. E. G.: Chem. of Insecticides, Herbicides and Fungicides, 2nd ed., September 1948, pp. 108–122.

U. S. DEPARTMENT OF COMMERCE
PATENT OFFICE
CERTIFICATE OF CORRECTION

Patent No. 2,818,365                                          December 31, 1957

George F. Deebel et al.

It is hereby certified that error appears in the printed specification of the above numbered patent requiring correction and that the said Letters Patent should read as corrected below.

Column 3, line 15, for "2-(dodecylthio)amine" read -- 2-(dodecylthio)ethylamine --.

Signed and sealed this 3rd day of June 1958.

(SEAL)

Attest:
KARL H. AXLINE
Attesting Officer

ROBERT C. WATSON
Commissioner of Patents